(12) United States Patent
Pomaranski et al.

(10) Patent No.: US 7,484,065 B2
(45) Date of Patent: Jan. 27, 2009

(54) SELECTIVE MEMORY ALLOCATION

(75) Inventors: Ken Gary Pomaranski, Roseville, CA (US); Andy Harvey Barr, Roseville, CA (US); Dale John Shidla, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 257 days.

(21) Appl. No.: 10/827,946

(22) Filed: Apr. 20, 2004

(65) Prior Publication Data

US 2005/0235124 A1 Oct. 20, 2005

(51) Int. Cl.
*G06F 12/00* (2006.01)
*G06F 13/00* (2006.01)
*G06F 13/28* (2006.01)
*G06F 17/30* (2006.01)
*G06F 11/00* (2006.01)
*G11C 29/00* (2006.01)

(52) U.S. Cl. .................... 711/170; 711/171; 711/172; 711/173; 707/205; 714/5; 714/42; 714/702; 714/710; 714/763; 714/773

(58) Field of Classification Search ......... 711/170–173; 707/205; 714/5, 42, 702, 710, 763, 773
See application file for complete search history.

(56) References Cited

U.S. PATENT DOCUMENTS

| | | | |
|---|---|---|---|
| 4,584,681 A | | 4/1986 | Singh et al. |
| 4,628,509 A | | 12/1986 | Kawaguchi |
| 5,287,500 A | * | 2/1994 | Stoppani, Jr. ................ 711/211 |
| 5,500,940 A | * | 3/1996 | Skeie ........................... 714/25 |
| 5,550,838 A | | 8/1996 | Okajima |
| 5,790,886 A | * | 8/1998 | Allen ............................ 710/5 |
| 5,867,642 A | * | 2/1999 | Vivio et al. .................... 714/8 |
| 5,907,854 A | * | 5/1999 | Kerns ........................... 711/103 |
| 6,096,093 A | | 8/2000 | Caywood et al. |
| 6,130,442 A | | 10/2000 | DaZenzo et al. |
| 6,212,647 B1 | * | 4/2001 | Sims et al. ..................... 714/8 |
| 6,265,232 B1 | | 7/2001 | Simmons |
| 6,330,621 B1 | * | 12/2001 | Bakke et al. ................... 710/5 |
| 6,360,340 B1 | | 3/2002 | Brown et al. |
| 6,441,897 B1 | | 8/2002 | Zeimantz |
| 6,446,224 B1 | | 9/2002 | Chang et al. |
| 6,553,533 B2 | | 4/2003 | Demura et al. |
| 6,622,270 B2 | | 9/2003 | Beffa |
| 6,813,740 B1 | | 11/2004 | Lejeune |
| 6,829,554 B2 | | 12/2004 | Dueregger et al. |

(Continued)

FOREIGN PATENT DOCUMENTS

EP 283564 A1 9/1988

OTHER PUBLICATIONS http://en.wikipedia.org/wiki/Interleaving.*

(Continued)

*Primary Examiner*—Sanjiv Shah
*Assistant Examiner*—Yaima Campos

(57) ABSTRACT

Methodology, systems and media associated with selectively allocating memory are described. One exemplary method embodiment comprises receiving a quality data that identifies the quality of one or more allocatable subsets of a memory and selectively allocating a subset of memory from the allocatable memory to an application based, at least in part, on memory quality as identified in the quality data.

29 Claims, 9 Drawing Sheets

U.S. PATENT DOCUMENTS

| | | | |
|---|---|---|---|
| 6,931,509 B2* | 8/2005 | Lloyd-Jones | 711/206 |
| 6,993,678 B2* | 1/2006 | Cheok et al. | 714/8 |
| 7,168,010 B2 | 1/2007 | Yadavalli et al. | |
| 2001/0020254 A1* | 9/2001 | Blumenau et al. | 709/229 |
| 2001/0036306 A1 | 11/2001 | Wienecke | |
| 2001/0052102 A1 | 12/2001 | Roohparvar | |
| 2002/0066056 A1 | 5/2002 | Suzuki et al. | |
| 2002/0087913 A1* | 7/2002 | Harper et al. | 714/15 |
| 2002/0099996 A1 | 7/2002 | Demure et al. | |
| 2002/0116651 A1* | 8/2002 | Beckert et al. | 713/300 |
| 2003/0023811 A1* | 1/2003 | Kim et al. | 711/114 |
| 2003/0088737 A1* | 5/2003 | Burton | 711/118 |
| 2004/0030957 A1 | 2/2004 | Yadavalli et al. | |
| 2004/0152477 A1* | 8/2004 | Wu et al. | 455/466 |
| 2004/0225946 A1 | 11/2004 | Hashimoto et al. | |
| 2004/0243692 A1* | 12/2004 | Arnold et al. | 709/220 |
| 2005/0033935 A1* | 2/2005 | Manbert et al. | 711/170 |
| 2005/0097406 A1* | 5/2005 | Brebisson | 714/52 |

OTHER PUBLICATIONS

U.S. Patent Office; Office Action for U.S. Appl. No. 10/652,098; dated Jan. 25, 2008.

U.S. Patent Office; Office Action for U.S. Appl. No. 10/652,098; dated Jun. 19, 2007.

U.S. Patent Office; Office Action for U.S. Appl. No. 10/652,098; dated Jan. 3, 2007.

U.S. Patent Office; Office Action for U.S. Appl. No. 10/652,098; dated Jul. 17, 2006.

U.S. Patent Office; Office Action for U.S. Appl. No. 10/652,098; dated Jan. 24, 2006.

"Circuit complexity reduction for symbolic analysis of analog integrated circuits" by Daems et al. This paper appears in: Proceedings of 36th Design—Automation Conference, Pub. Date: 1999 On pp. 958-963 ISBN: 1-58113-092-9 INSPEC Accession No. 6504326.

* cited by examiner

SELECTIVE MEMORY ALLOCATION

BACKGROUND

Computer systems and other electronic systems may contain memory that includes, for example, dynamic random access memory (DRAM) chips. The DRAMs may be organized, for example, onto memory boards or partitioned into dual in line memory modules (DIMMS). This memory may be virtualized by an operating system associated with a computer system. The operating system may be responsible for allocating physical and/or virtual memory to applications. The applications may have varying memory usage requirements like the amount of memory needed, the time period for which the memory is needed, and the like. An application may fail if there is an error in the memory allocated to it. However, the repercussions associated with an application failing may vary. For example, a memory error that leads to a failure in a nuclear power plant control application may have different repercussions than a memory error that leads to a failure in a screen-saver application. Although memory failures in both types of applications are to be avoided, a nuclear power plant crash may have more serious repercussions than a screen saver crash.

Some systems may attempt to minimize overall memory failures (and thus related application failures) using CRC (cyclic redundancy checking) protection. Other systems may attempt to minimize the likelihood of failures due to memory errors through memory monitoring and page deallocation. For example, pages where a memory error has been experienced or pages where some pre-determined number of errors have been encountered may be taken off line and not used. This technique makes these de-allocated pages unusable, which reduces the total amount of memory available. Still other systems may swap in hardware when a block of memory has failed. If the spare memory on the swapped in hardware is consumed then applications whose failures can lead to dire consequences (e.g., nuclear reactor monitor program) may be allocated "less healthy" memory and be more susceptible to failures.

As mentioned above, a computer system may employ virtual memory. Virtual memory may be thought of as an imaginary or logical (e.g., not physical) memory area that provides an alternate, oftentimes larger, set of memory addresses. Programs may store instructions and data in these virtual addresses. Then, when an instruction is actually executed or a piece of data is actually referenced, the instruction or data, or more typically a larger subset of memory (e.g., a page) in which the addressed item is located is moved to physical memory if it is not already resident in physical memory. A mapping between the imaginary virtual address and the actual physical address may be stored, for example, in a page table. To facilitate efficient address mapping resolution, portions of the page table may be stored in a translation lookaside buffer.

Virtual memory is typically employed to enlarge the address space available to a program. Virtual memory also facilitates decoupling physical memory addressing from application programming. As mentioned above, addressable items like instructions and/or data associated with a virtual memory page may be brought into physical memory when a logic determines that an addressed item is not in physical memory. Detecting that an addressed item is not in physical memory may be referred to as detecting a memory fault. When memory is organized into pages, this may be referred to as detecting a page fault. When a page fault is detected, an allocation of physical memory may occur, which may include creating and recording a mapping between the virtual address and the physical address. In some systems, the physical allocation may change over time and thus the virtual to physical mapping may also change. Applications usually remain unaware of page fault detection and handling, physical memory allocation, address mapping, and the like, since these operations are typically performed by an operating system or lower level logic.

Some components of a typical virtual memory system are illustrated in FIG. 9. A physical memory 900, which includes subsets (e.g., pages) of memory 902 through 908 may be operably connected to and/or accessible by a processor 910. A virtual memory 920, which includes a larger number of subsets (e.g., pages) of memory 922 through 928 may also be available to the system associated with the physical memory 900 and the processor 910. If the processor 910 attempts to access an addressable item located in the virtual memory 920, and page table 930 indicates that the addressable item (and/or its page) are not currently stored in physical memory 900, then the page fault handler 940 may cause a subset of the virtual memory 920 to be copied into the physical memory 900, and may update the page table 930 to reflect the virtual to physical memory mapping.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
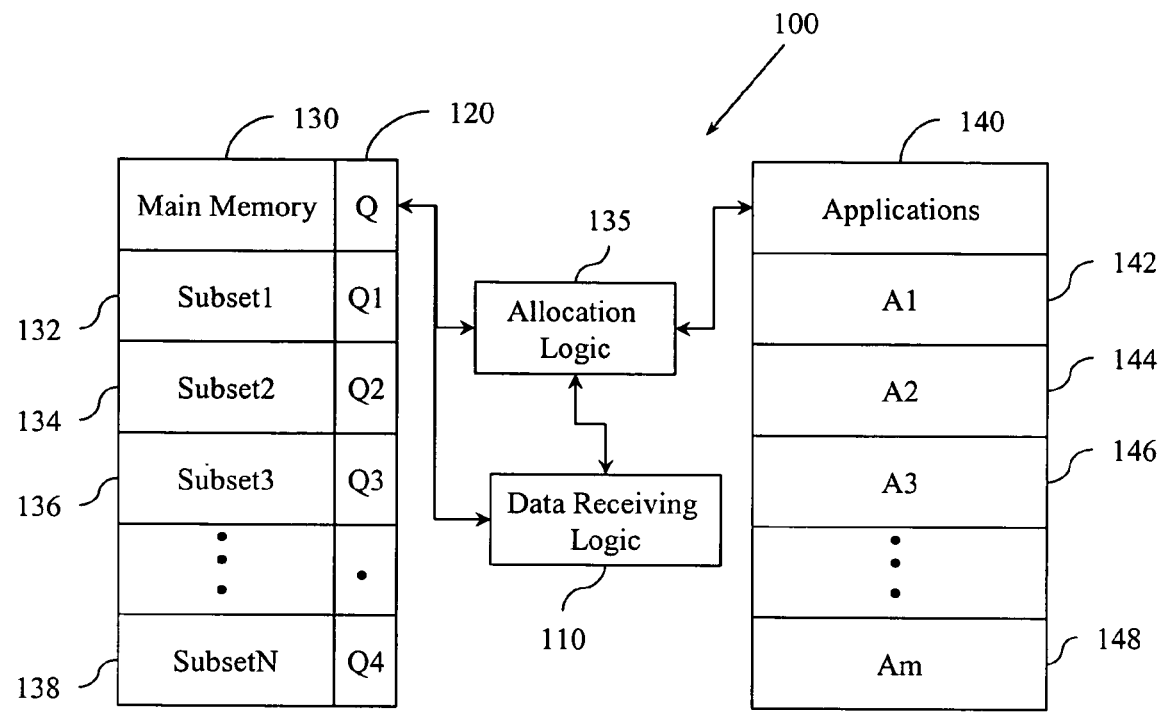
FIG. 1 illustrates an example selective memory allocation system.

This application describes example systems, methods, computer-readable mediums and so on associated with selectively allocating memory based, at least in part, on memory quality. The selective allocation may, in some examples, be associated with virtual memory systems and/or memory interleaving systems. The examples may analyze quality data that identifies memory quality before determining which memory to allocate. Similarly, the examples may analyze a preference data that identifies memory quality preferences for applications to which memory will be allocated. The preference data may store information like the minimum acceptable memory quality that an application would prefer. Based on these analyses, the example systems and so on may allocate memory to certain applications so that memory that is less likely to experience an error and potentially cause an application to fail is allocated to applications that a user least wants to fail. Additionally, in some examples, memory may be dynamically re-allocated based on changing memory conditions.

By way of illustration, the example systems may attempt to allocate memory that is less likely to fail to "critical" applications (e.g., applications user does not want to fail) and potentially less robust physical memory to less critical applications (e.g., applications whose failure may be tolerable). Having the flexibility to receive, and/or analyze data concerning memory quality (e.g., "health") and having the ability for the memory for which quality data is available to be allocated to applications with varying "criticality" facilitates maximizing memory utility. Memory that is not of a high enough quality for some applications (e.g., more critical applications) but that is potentially acceptable to other applications (e.g., less critical applications) may historically have been de-allocated reducing overall memory usage utility. The example systems and methods described herein facilitate using lower quality memory for less critical applications. Thus, this lower quality memory does not have to be de-allocated and overall memory usage utility may be increased.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Critical", as used herein to characterize a computer executable application refers to a measurement, property, and/or characteristic associated with how desirable it is to have the computer executable application run without failing due, for example, to a memory error. A critical application may be, for example, an application like airplane autopilot software, traffic light control software, a priority monitor in an operating system, and the like. But "critical" can also apply to applications that a user defines as being critical. For example, to an ardent gamer, a video game may be the most critical application on a computer system, particularly during a period of time when they are approaching a high-score.

Thus, what is critical to one user and/or system may not be critical to another user and/or system. Therefore, critical refers to a configurable measurement, property, and/or characteristic that can be assigned to an application. A user and/or logic may assign a "criticality rank" to an application. For example, a discrete criticality range may go from zero to ten and a first application may be assigned a score of ten indicating that it prefers highest quality memory while a second application may be assigned a score of five indicating that it will accept lower quality memory than the first application.

A user and/or logic may additionally and/or alternatively assign a "relative criticality rank" to an application. For example, applications may be criticality ordered so that an application with a higher memory quality preference will be allocated a higher quality memory than a second application with a lower memory quality preference.

Criticality should not be confused with the familiar operating system concept of scheduling priority. Application scheduling priority generally concerns how soon an application is to be run, what other applications the application can pre-empt, and so on. Criticality is more concerned with reducing the likelihood that an application will experience failures due to memory errors. Thus, a highly critical application may also be a low priority application.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, optical or magnetic disks, dynamic memory and so on. Common forms of a computer-readable medium include, but are not limited to, an application specific integrated circuit (ASIC), a compact disc (CD), a digital video disk (DVD), a random access memory (RAM), a read only memory (ROM), a programmable read only memory (PROM), an electronically erasable programmable read only memory (EEPROM), a disk, a memory stick, a floppy disk, a flexible disk, a hard disk, a magnetic tape, other magnetic media, a CD-ROM, other optical media, punch cards, paper tape, other physical media with patterns of holes, an EPROM, a FLASH-EPROM, or other memory chip or card, and other media from which a computer, a processor or other electronic device can read.

"Logic", as used herein, includes but is not limited to hardware, firmware, software in execution and/or combinations of each to perform a function(s) or an action(s), and/or to cause a function or action from another component. For example, based on a desired application or needs, logic may include a software controlled microprocessor, discrete logic (e.g., ASIC), a programmed logic device, a memory device containing instructions, and so on. Where multiple logical logics are described, it may be possible to incorporate the multiple logical logics into one physical logic. Similarly, where a single logical logic is described, it may be possible to distribute that single logical logic between multiple physical logics.

"Signal", as used herein, includes but is not limited to one or more electrical or optical signals, analog or digital, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend on, for example, the requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, machine, firmware, microcode, and/or other languages and tools. Software, whether an entire system or a component of a system, may be embodied as an article of manufacture and maintained as part of a computer-readable medium as defined previously. Another form of the software may include signals that transmit program code of the software to a recipient over a network or other communication medium.

An "operable connection", or a connection by which entities are "operably connected", is one in which signals, physical communication flow, and/or logical communication flow may be sent and/or received, directly and/or indirectly between entities. Typically, an operable connection includes a physical interface, an electrical interface, and/or a data interface, but it is to be noted that an operable connection may include differing combinations of these or other types of connections sufficient to allow operable control.

"User", as used herein, includes but is not limited to one or more persons, software, computers or other devices, logics, processes, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description terms like processing, computing, calculating, determining, analyzing, receiving, displaying, or the like refer to actions and processes of a computer system, logic, processor, or similar electronic device that manipulates and transforms data represented as physical (electronic) quantities.

FIG. 1 illustrates a system 100 for selectively allocating memory based, at least in part, on the memory quality. The system 100 includes a data receiving logic 110 configured to receive a quality data 120 that identifies a memory quality of one or more allocatable subsets of a memory 130. The quality data 120 identifies memory quality and thus may store, for example, information concerning, but not limited to, a discrete memory quality ranking, a relative memory quality ranking, and a record of memory errors (e.g., number, type, frequency, severity). Thus, the quality data 120 may store direct quality information like error types and/or indirect quality information like a relative ranking. Memory may experience errors like transient single bit errors, multi-bit errors, stuck-at single bit errors, and the like, which can be analyzed to produce the quality data 120. The quality data 120 may include a discrete ranking and/or a relative ranking. For example, a subset of memory may be assigned a discrete score in a range like a five on a scale of zero to ten. Similarly, the relative ranking may indicate that the quality of subset x is superior to the quality of subset y. The quality ranking may be, additionally and/or alternatively, an indicator of the past performance of a subset of memory (e.g., number, type, frequency) of errors. With this quality data 120 available, memory can be selectively allocated based on memory quality as identified in the quality data 120.

Thus, the system 100 may include an allocation logic 135 configured to analyze the quality data 120 and to selectively allocate a subset of memory from the memory 130 to an application based, at least in part, on memory quality as identified in the quality data 120. In one example, the system 100 may be employed with a system that includes a virtual memory system. Thus, the allocation logic 135 may interact with and/or communicate with various virtual memory system logics like a page fault detection logic, a page table, a virtual-to-physical memory mapper, a memory map data store, and so on. Thus it will be appreciated by one skilled in the art that the example systems and methods described herein may, in some cases, be associated with, interact with, and/or be incorporated into various virtual memory system logics.

As described above, some computer systems may employ virtual memory. Thus, it is to be appreciated that the allocation logic may interact with a virtual memory system. In one example, a virtual memory system may be configured with an allocation logic that manages physical memory allocations based, at least in part, on memory quality ranking. In another example, the memory quality ranking of a memory unit (e.g., DRAM) may change after physical memory allocation, (e.g., during application run time). Thus, in the example, the allocation logic and/or a virtual memory system may be configured to dynamically change a physical memory allocation based on the changing memory quality ranking.

The allocation logic 135 may service a set of applications 140 with pending memory allocation requests. The allocation logic 135 may examine the quality data 120 to facilitate allocating memory to satisfy the memory allocation requests in order from the highest quality memory first to lower quality memory, for example. By way of illustration, subset1 132 may have a high quality ranking and subset2 134 through subsetN 138 (N being an integer) may share lower quality rankings. Applications A1 142 through application Am 148 (m being an integer) may have pending memory allocation requests. The allocation logic 135 may identify that subset1 132 has the highest quality ranking and assign it to satisfy the memory allocation request associated with application A1 142. The actual assignment may include, for example, virtual memory system logics. Then, to satisfy the memory allocation request for application A2 144, the allocation logic 135 may allocate subset3 136 since the remaining subsets 134 through 138 have similar lower quality rankings. Subsequently, the memory allocated to application A1 142 may be released. Thus, the allocation logic 135 may allocate subset1 132 a second time to satisfy the memory request for application A3 146. While allocating memory on a "best memory first" approach is described, it is to be appreciated that other approaches based on memory quality can be employed. Furthermore, in one example, the allocation logic 135 may be configured to dynamically select and/or alter a memory allocation algorithm based, for example, on the quality data 120.

Figure 2:
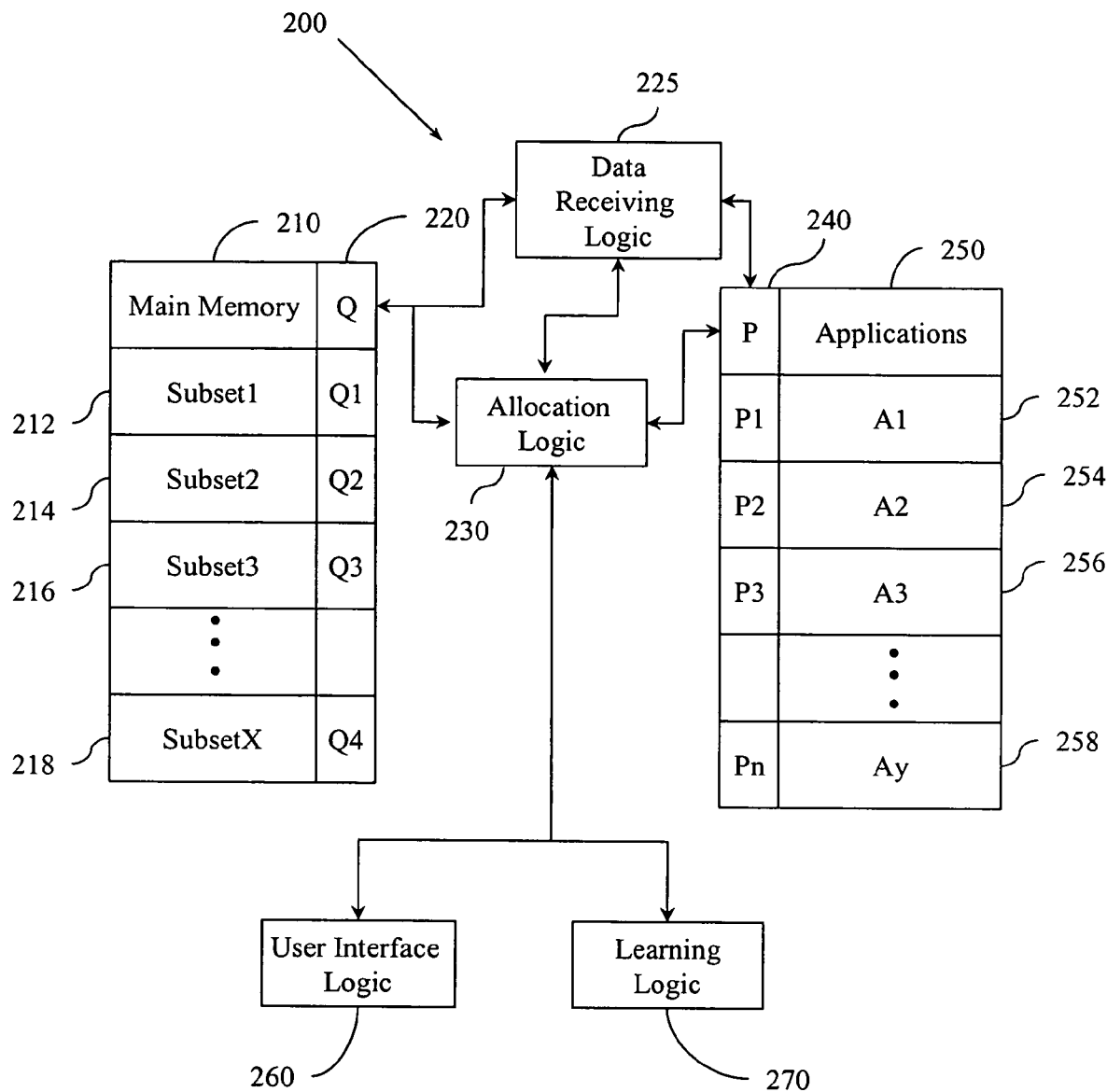
FIG. 2 illustrates another example selective memory allocation system.

FIG. 2 illustrates a system 200 for selectively allocating memory based, at least in part, on memory quality and the quality of memory that is acceptable to and/or preferred by an application. The system 200 allocates memory from a memory 210 for which a quality data 220 is available. The quality data 220 may identify the memory quality of one or more allocatable subsets of a memory and thus may store, for example, discrete quality rankings, relative quality rankings, indications of memory error likelihood, indications of memory errors experienced, and so on. The system 200 may receive the quality data 220 through a data receiving logic 225, for example.

The system 200 may include an allocation logic 230 configured to analyze the quality data 220 and to selectively allocate a subset of memory from the memory 210 to an application based, at least in part, on the memory quality as identified in the quality data 220. As described above, in some examples the allocation logic 230 may cooperate with and/or be a part of a virtual memory system. By way of illustration, the allocation logic 230 may be servicing a set of applications 240 with pending memory allocation requests. The allocation logic 230 may examine the quality data 220 and determine to allocate memory to the applications based on an approach like "best memory first".

However, the system 200 may also have access to a preference data 240 associated with identifying a memory quality preference of the set of applications 250 to which memory is to be allocated. The preference data 240 may store information including, but not limited to, a memory quality level acceptable to an application, a memory quality level preferred by an application, a discrete application criticality rank, a relative application criticality rank, and so on. For example, the preference data 240 may identify that an application A1 252 will only accept memory with a discrete quality ranking above a threshold (e.g., 7 out of 10 on a 0-10 scale). Similarly, the preference data 240 may identify that application A2 254 may prefer memory with a relative quality ranking that places the memory in the top half of the available memory. The preference data 240 may also identify, for example, that an application A3 256 is willing to accept memory regardless of its quality rank.

Thus, the allocation logic 230 may be further configured to selectively allocate a subset of memory from the memory 210 based, at least in part, on the memory quality as identified in the quality data 220, and the application memory quality preference(s) as identified in the preference data 240. The allocation logic 230 can selectively allocate the memory using various algorithms. In one example, the allocation logic 230 is configured to allocate memory that satisfies a quality threshold with respect to a memory quality level acceptable to an application, a memory quality level preferred by an application, a discrete application criticality rank, and/or a relative application criticality rank. The quality threshold may be, for example, that memory quality exceeds the quality acceptable to an application, that memory quality meets the quality acceptable to an application, that memory quality is within a percentage (e.g., ten percent) of the quality acceptable to an application, that memory quality is within one rank of the quality acceptable to an application, and the like.

In another example, the allocation logic 230 may be configured to allocate memory so that a memory utility measure is optimized. Memory utility may be measured in various ways. In one example, the sum of the products of a memory quality ranking and an application preferred memory quality ranking may be used as a utility measure. In another example, a ratio of allocated memory, like high quality memory compared to low quality memory may be employed as a utility measure. In still another example, a ratio of applications whose memory preferences are met or exceeded compared to applications whose memory preferences are not met may be employed as a utility measure. While three example utility measures are provided it is to be appreciated that other utility measurements can be employed.

In one example, the allocation logic 230 may be configured to allocate memory only if a utility measure that would result from the allocation meets a threshold. Additionally and/or alternatively, the allocation logic 230 may be configured to allocate memory only if a utility measure for the application to which the memory would be allocated meets a threshold. By way of illustration, a user may wish to balance performance time against risk of failure and thus the cost of application(s) failure may be weighed against performance delays. By way of further illustration, overall memory usage may be weighed against another factor like processor power consumption in a utility calculation. Thus, the threshold may, in some examples, be dynamically (re)programmed by a user and/or monitoring logic. While various selective memory allocation algorithms are described above, it is to be appreciated that other algorithms may be employed. Furthermore, it is to be appreciated that in one example the system 200 may take actions like dynamically switching between, adapting, and/or blending allocation algorithms. For example, the allocation logic 230 may initially allocate memory on a "best memory first" algorithm. However, if a utility measure approaches a threshold, the allocation logic 230 may switch to a "utility increasing" algorithm.

In one example, the system 200 may also include a user interface logic 260 configured to present a user with a suggested memory allocation and to receive an indication from the user concerning whether the suggested memory allocation is acceptable. Thus, in one example, the allocation logic 230 may not automatically allocate memory but may present a user with suggestions and/or warnings concerning potential allocations before allocating. In another example, the allocation logic 230 may facilitate a user configuring the memory quality data 220 and/or the preference data 240. As described above, the preference data 240 may store subjective criticality rankings and thus the user interface logic 260 may facilitate acquiring these subjective criteria. The user interface logic 260 may also be employed, for example, to present allocation information like which memory has been allocated, which memory has not been allocated, the ratio of satisfied requests to unsatisfied requests, memory utility measures, and the like.

In another example, the system 200 may also include a learning logic 270 that is configured to analyze whether a suggested memory allocation is acceptable to a user based on an indication from the user (e.g., received through the user interface logic 260) and to dynamically reconfigure the user interface logic 260, the allocation logic 230, and/or selective memory allocation parameters based on the analysis. For example, if a user has been presented with ten similar memory allocation suggestions and has accepted all ten suggestions, then the learning logic 270 may adapt the user interface logic 260 memory selection parameters and/or the allocation logic 230 with respect to similar selections and presentations.

System 100 (FIG. 1) and system 200 may be associated with and/or embedded in a variety of systems including, but not limited to, a computer, an image forming device, a printer, a cellular telephone, a personal digital assistant, a server, and so on.

Figure 3:
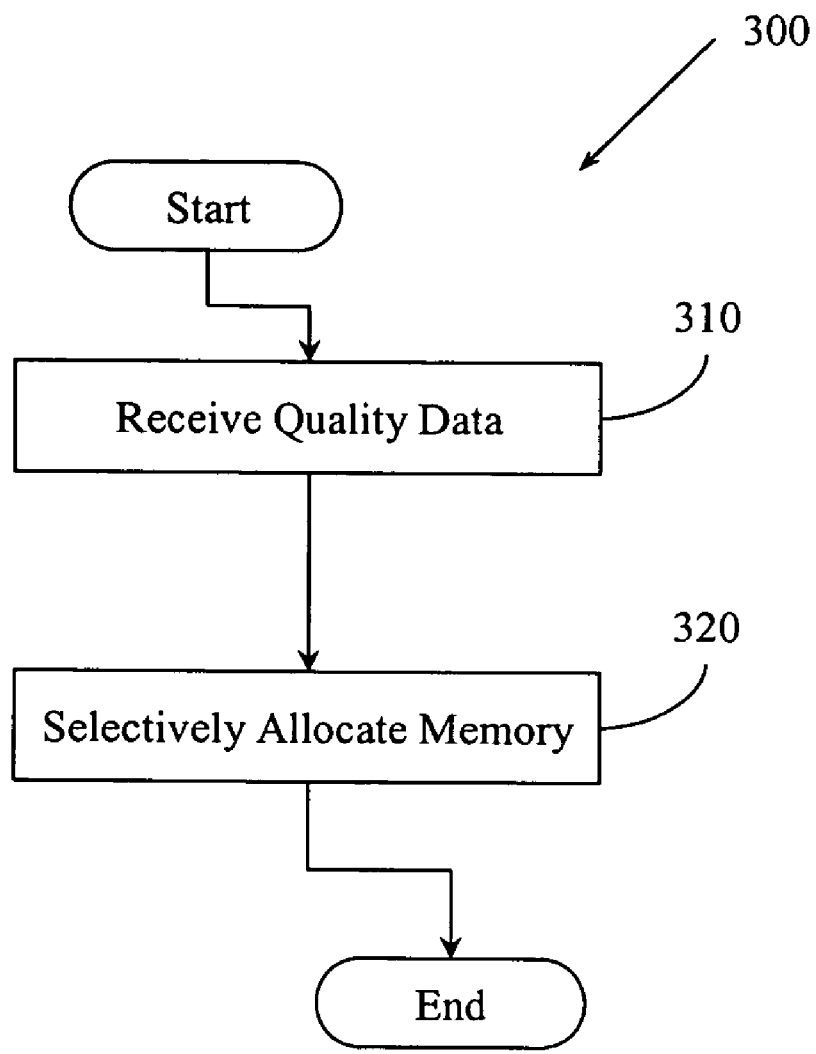
FIG. 3 illustrates an example selective memory allocation method.
Figure 4:
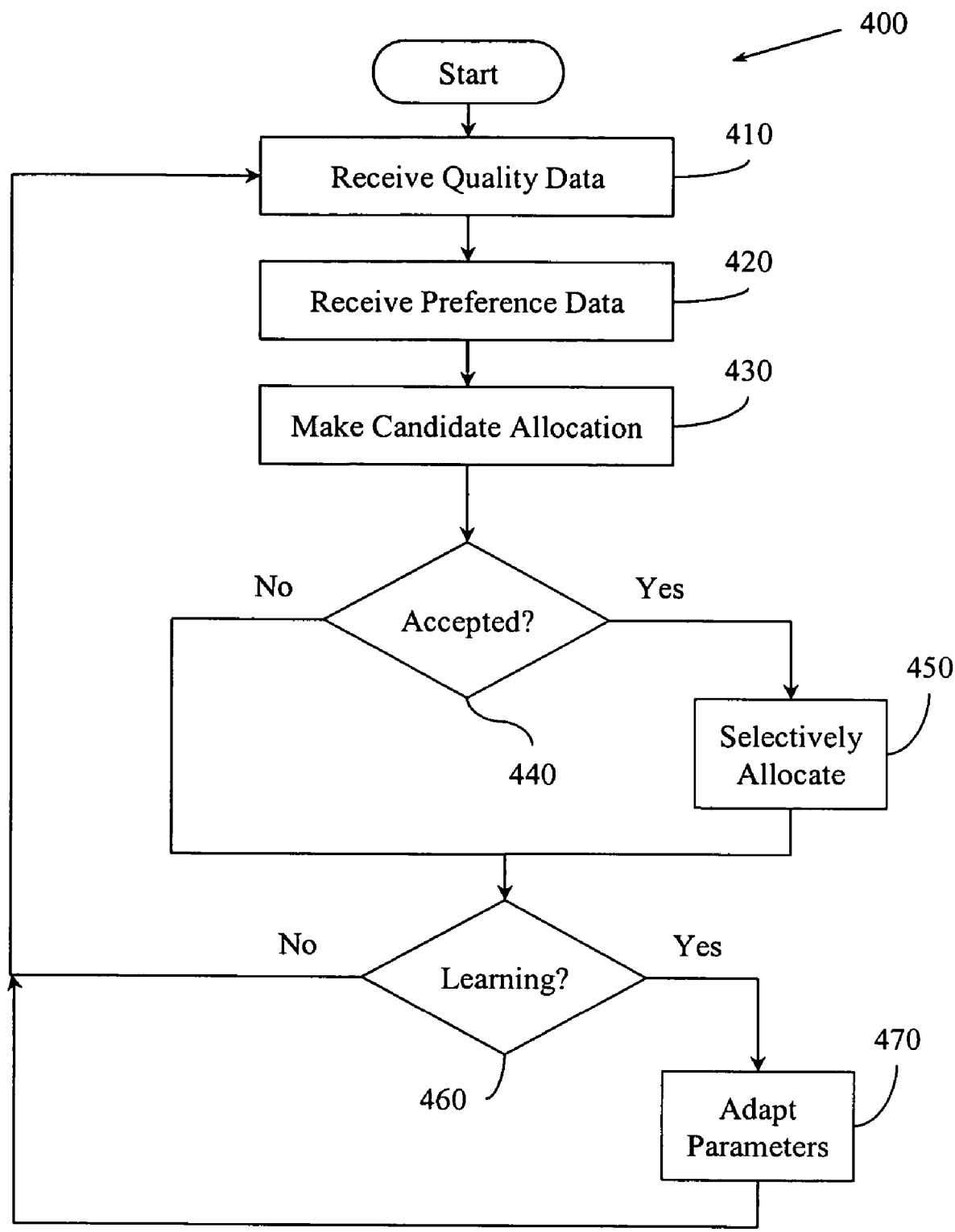
FIG. 4 illustrates another example selective memory allocation method.

Example methods may be better appreciated with reference to the flow diagrams of FIGS. 3 and 4. To simplify explanation, the illustrated methodologies are shown and described as a series of blocks. It is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or or alternative methodologies can employ additional, not illustrated blocks. In one example, methodologies are implemented as processor executable instructions and/or operations stored on a computer-readable medium.

In the flow diagrams, blocks denote "processing blocks" that may be implemented, for example, in software. Additionally and/or alternatively, the processing blocks may represent functions and/or actions performed by functionally equivalent circuits like a digital signal processor (DSP), an ASIC, and the like.

A flow diagram does not depict syntax for any particular programming language, methodology, or style (e.g., procedural, object-oriented). Rather, a flow diagram illustrates functional information one skilled in the art may employ to produce software to perform the illustrated processing. It will be appreciated that in some examples, program elements like temporary variables, routine loops, and so on are not shown. It will be further appreciated that electronic and software applications may involve dynamic and flexible processes so that the illustrated blocks can be performed in other sequences different from those shown and/or that blocks may be combined or separated. It will be appreciated that the processes may be implemented using various programming approaches like machine language, procedural, object oriented and/or artificial intelligence techniques.

FIG. 3 illustrates an example method 300 for selectively allocating memory based on memory quality. The method 300 includes, at 310, receiving a quality data that identifies the memory quality of one or more subsets of a set of allocatable memory. The quality data may store information including, but not limited to, a discrete quality ranking for allocatable subsets of memory, a relative quality ranking for allocatable subsets of memory, a record of past memory errors (e.g., number, type, frequency) and so on.

The method 300 may also include, at 320, selectively allocating a subset of memory from the set of allocatable memory to an application based, at least in part, on the memory quality as identified in the quality data. The selective allocation may be made according to one or more algorithms. For example, memory may be allocated on a "worst memory first" basis to exercise the lowest quality memory. Similarly, the memory may be allocated on a round robin basis to equalize memory usage with the allocation categories being determined by memory quality. However, a more likely example would be to allocate memory on a "best memory first" basis. In one example, the method 300 may not actually allocate the memory itself but may send a signal to a virtual memory system logic that performs the actual physical allocation.

While FIG. 3 illustrates various actions occurring in serial, it is to be appreciated that various actions illustrated in FIG. 3 could occur substantially in parallel. By way of illustration, a first process could receive quality data. Similarly, a second process could analyze the quality data while a third process could selectively allocate memory based on the memory quality as identified in the quality data. While three processes are described, it is to be appreciated that a greater and/or lesser number of processes could be employed and that lightweight processes, regular processes, threads, and other approaches could be employed.

FIG. 4 illustrates an example method 400 for selectively allocating memory based on memory quality and application memory quality preference(s). The method 400 may include, at 410, receiving a quality data that identifies the quality of one or more subsets of a set of allocatable memory. The method 400 may also include, at 410, receiving a preference data that identifies the memory quality preferences and/or requirements of an application and, at 430, making a candidate allocation of a subset of memory based, at least in part, on the memory quality and application memory quality preference(s). In one example, at 430, the subset of memory would be allocated while in other example methods, the user and/or an acceptance logic may be presented with a choice concerning the candidate allocation. Similarly, in one example, at 430, a signal may be communicated to a virtual memory logic that may participate in an actual physical allocation.

The quality data may store information including, but not limited to, a discrete quality ranking for allocatable subsets of memory, a relative quality ranking for allocatable subsets of memory, a record of memory errors (e.g., number, type, frequency) and so on. Similarly, the preference data may store information including, but not limited to, a memory quality level acceptable to an application, a memory quality level preferred by an application, a discrete application criticality rank, and a relative application criticality rank.

The method 400 may take various approaches to how memory is selectively allocated. In one example, the highest quality memory available is allocated. In another example, memory is allocated to satisfy a quality threshold associated with a requesting application. The threshold may concern, for example, a memory quality level acceptable to the application, a discrete application criticality rank, a relative application criticality rank, and the like. Example thresholds include, but are not limited to, that the quality level exceeds the minimum quality acceptable to the application (e.g., as recorded in the preference data), that the quality level meets the minimum quality acceptable to the application, that the quality level is within ten percent of the minimum quality acceptable by the application, and that the quality level is within one rank of the minimum quality acceptable by the application. It is to be appreciated that a threshold may be a discrete value, a range of values, and so on.

In one example, the method 400 may include presenting a suggested memory allocation to a user and accepting a decision concerning the suggested memory allocation from the user. Thus, at 440, a determination may be made concerning whether the candidate allocation of 430 is accepted. If the determination at 440 is yes, then at 450 the method 400 may selectively allocate the subset of memory.

In one example, the method 400 may include analyzing a decision concerning the suggested memory allocation and selectively adapting memory allocation parameters based on the analyzing. By way of illustration, if a user consistently denies requests to allocate memory that falls below a desired quality ranking for a set of applications with similar criticality rankings, then the method 400 may learn to stop making these types of suggestions and attempt to allocate higher quality memory to that set of applications. Thus, method 400 may include, at 460, making a determination concerning whether automated learning is enabled. If automated learning is enabled, then at 470 items like memory allocation parameters and suggestion parameters may be adapted.

While FIG. 4 illustrates various actions occurring in serial, it is to be appreciated that various actions illustrated in FIG. 4 could occur substantially in parallel. By way of illustration, a first process could receive and analyze quality data. Similarly, a second process could receive and analyze preference data while a third process could compare quality data associated with subsets of memory to preference data associated with applications making memory allocation requests. While three processes are described, it is to be appreciated that a greater and/or lesser number of processes could be employed and that lightweight processes, regular processes, threads, and other approaches could be employed. Similarly, while method 400 illustrates seven actions, it is to be appreciated that various examples of method 400 may include a greater and/or lesser number of actions. For example, one example method may perform actions 410 through 450, while another example may perform actions 410, 420, 450, 460, and 470.

In one example, a computer-readable medium may store processor executable instructions operable to perform a method that includes receiving a quality data that identifies the memory quality of a set of allocatable memory, receiving a preference data that identifies the memory quality preferences and/or requirements of an application to which a subset of memory from the allocatable memory is to be allocated, and selectively allocating the subset of memory to the application based on the memory quality and the application memory quality preferences, where the memory that is allocated satisfies a quality threshold with respect to a memory quality level acceptable to the application, a memory quality level preferred by the application, a discrete application criticality rank, and/or a relative application criticality rank. While one example method is described being stored on a computer-readable medium it is to be appreciated that other methods may be stored on other computer-readable mediums.

Figure 5:
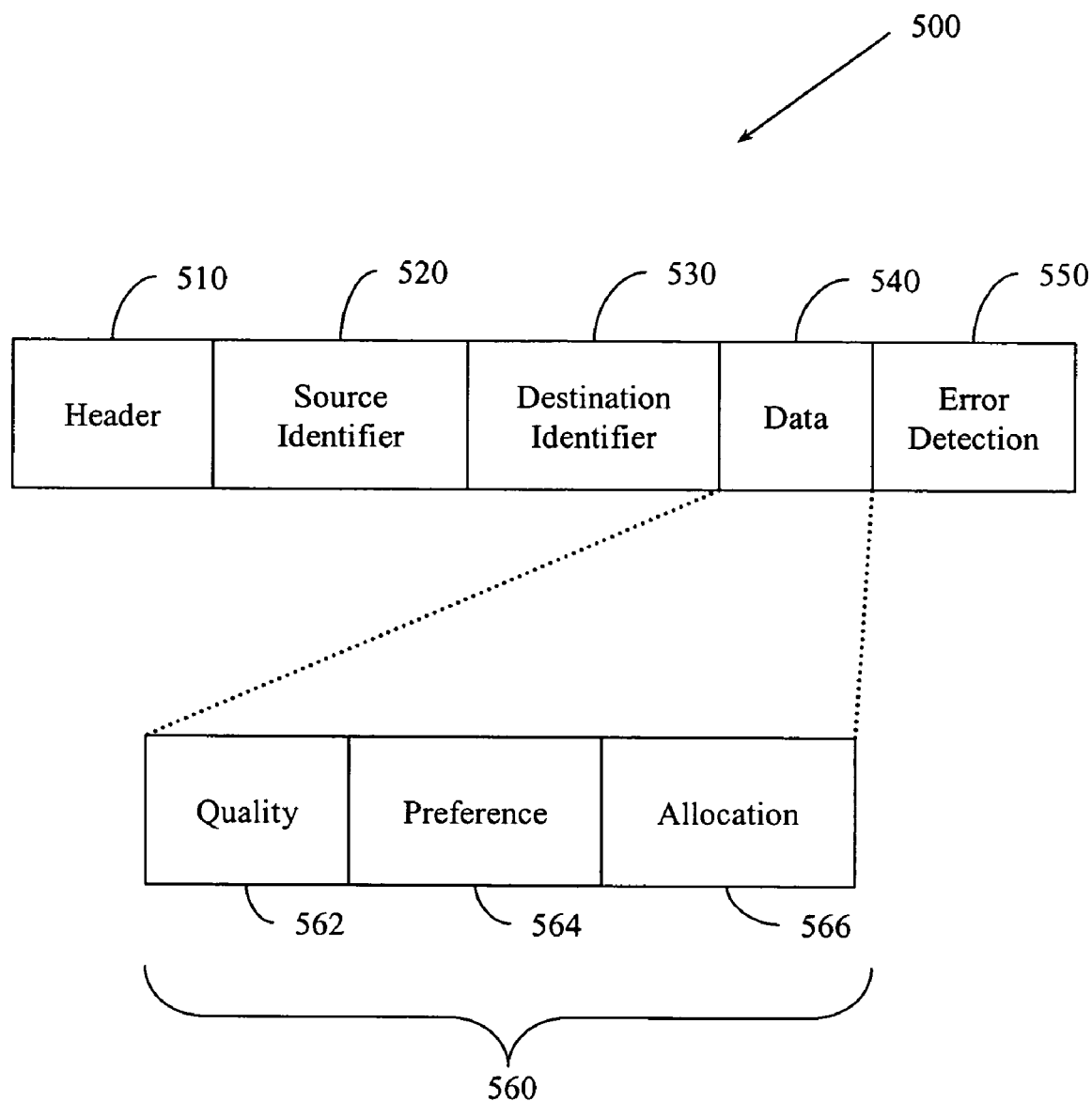
FIG. 5 illustrates an example data packet and sub-fields associated with the data packet.

Referring now to FIG. 5, information can be transmitted between various logics associated with selective memory allocation as described herein via a data packet 500. An exemplary data packet 500 is illustrated. The data packet 500 includes a header field 510 that may include information like the length and type of packet. A source identifier 520 follows the header field 510 and may include, for example, an address of the logic and/or device from which the packet 500 originated. Following the source identifier 520, the packet 500 includes a destination identifier 530 that may hold, for example, an address(es) of the logic(s) and/or device(s) to which the packet 500 is destined. The data field 540 in the packet 500 may include various information intended for the receiving logic and/or device. The data packet 500 ends with an error detecting and/or correcting field 550 whereby a logic can determine if it has properly received the packet 500. While five fields are illustrated in the data packet 500, it is to be appreciated that a greater and/or lesser number of fields can be present in data packets and that the fields can be arranged in various orders.

FIG. 5 also illustrates sub-fields 560 within the data field 540. The sub-fields 560 described are merely exemplary and it is to be appreciated that a greater and/or lesser number of sub-fields arranged in different orders could be employed with various types of data germane to selective memory allocation. The sub-fields 560 may include a field 562 that holds, for example, information concerning memory quality. The memory quality data may store information concerning, for example, a discrete quality ranking for an allocatable subset of memory, and/or a relative quality ranking for an allocatable subset of memory. The quality rankings may indicate, for example, the likelihood that a memory error will occur in a memory location. Additionally, and/or alternatively, the quality rankings may indicate, for example, the number of errors that a subset of memory has experienced. Since some example systems and methods attempt to allocate the "best" memory (e.g., least likely to experience an error, experienced fewest errors), relative rankings rather than discrete rankings may be recorded. In other example systems and methods, memory may be allocated only if a threshold for memory quality can be met. Thus, in these systems discrete rankings may be maintained.

The sub-fields 560 may also include a field 564 that stores, for example, memory preference data. The preference data may store information concerning, for example, a memory quality level that an application desires, a discrete application criticality rank, a relative application criticality rank, and the like. Once again allocations may be made on a discrete ranking (e.g., application of rank X requires memory of at least quality X) or on a relative basis (e.g., most critical application allocated highest quality memory). Thus the preference data may include the discrete ranking and/or the relative ranking.

The sub-fields 560 may also include a field 566 that stores, for example, allocation data. The allocation data may store, for example, a suggested memory allocation, a user response to the suggested allocation, a logic response to the suggested allocation, and the like. By way of illustration, after making a selective allocation decision, a system or method may present this decision to a user and/or acceptance logic that will respond to the suggestion.

Figure 6:
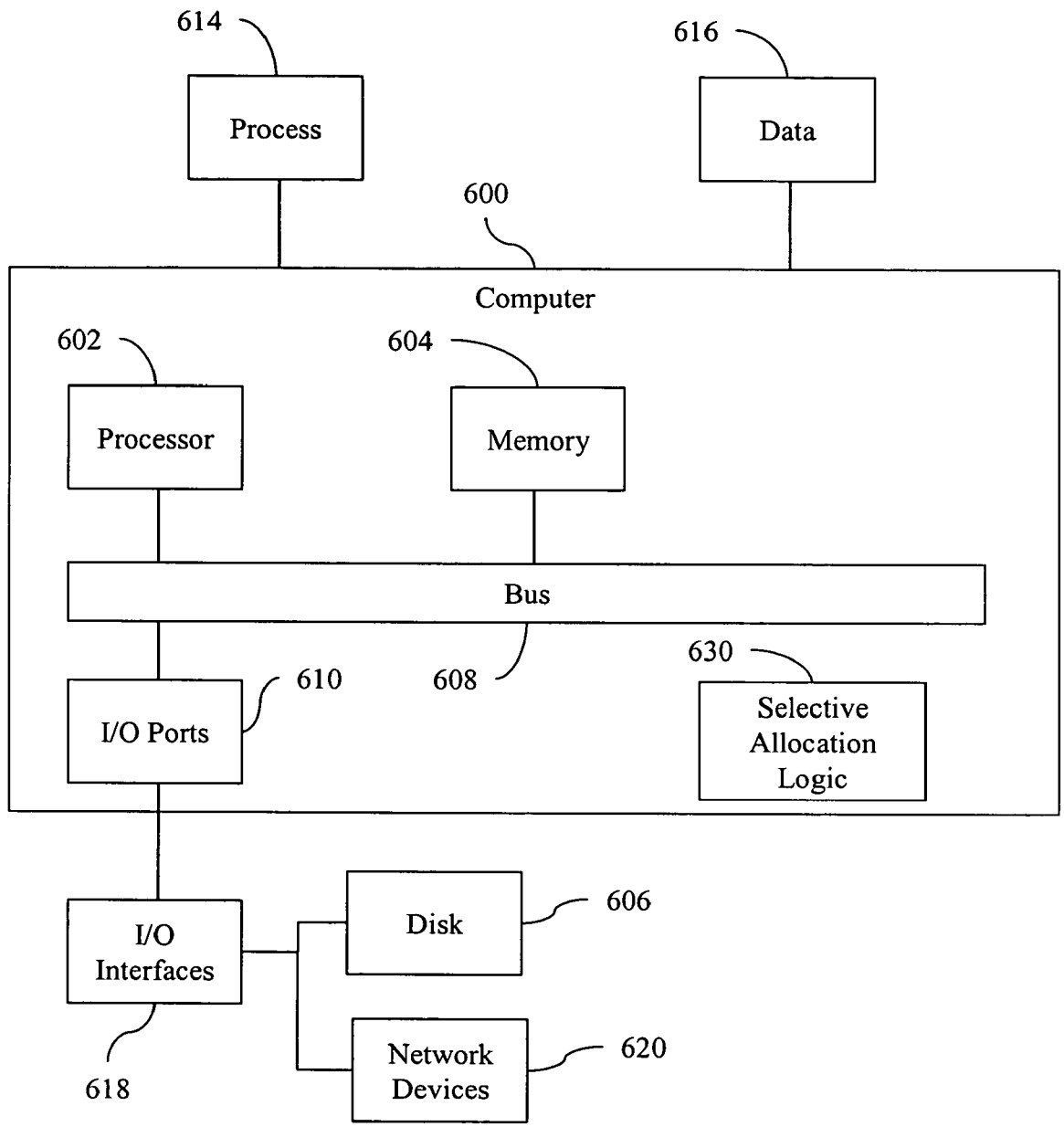
FIG. 6 illustrates an example computing environment in which example selective memory allocation systems and methods may operate.

FIG. 6 illustrates a computer 600 that includes a processor 602, a memory 604, and input/output ports 610 operably connected by a bus 608. Executable components of example systems described herein may be located on a computer like computer 600. Similarly, example computer executable methods described herein may be performed on a computer like computer 600. It is to be appreciated that other computers may also be employed with the example systems and methods described herein. The computer 600 may include, for example, a selective allocation logic 630. The selective allocation logic 630 may be configured, for example, to analyze quality data that identifies the quality of subsets of memory 604 and to selectively allocate subsets of memory 604 to, for example, process 614 based on the memory quality as identified in the quality data.

The processor 602 can be a variety of various processors including dual microprocessor and other multi-processor architectures. The memory 604 can include volatile memory and/or non-volatile memory. The non-volatile memory can include, but is not limited to, read only memory (ROM), programmable read only memory (PROM), electrically programmable read only memory (EPROM), electrically erasable programmable read only memory (EEPROM), and the like. Volatile memory can include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface 618 and/or an input/output port 610. The disk 606 can include, but is not limited to, devices like a magnetic disk drive, a solid state disk drive, a floppy disk drive, a tape drive, a Zip drive, a flash memory card, and/or a memory stick. Furthermore, the disk 606 can include optical drives like, a compact disc ROM (CD-ROM), a CD recordable drive (CD-R drive), a CD rewriteable drive (CD-RW drive) and/or a digital video ROM drive (DVD ROM). The memory 604 can store processes 614 and/or data 616, for example. The disk 606 and/or memory 604 can store an operating system that controls and allocates resources of the computer 600. The operating system may interact with the selective allocation logic 630 to selectively allocate subsets of the memory 604 to the process 614 based, for example, on the memory quality needs of the process 614 and the quality ranking of subsets of the memory 604.

The bus 608 can be a single internal bus interconnect architecture and/or other bus or mesh architectures. The bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with, for example, i/o interfaces 618 via input/output ports 610. Input/output interfaces 618 can include, but are not limited to, a keyboard, a microphone, a pointing and selection device, cameras, video cards, displays, disk 606, network devices 620, and the like. The input/output ports 610 can include but are not limited to, serial ports, parallel ports, and USB ports.

The computer 600 can operate in a network environment and thus may be connected to network devices 620 via the i/o interfaces 618 and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet/IEEE 802.3, token ring/IEEE 802.5, wireless/IEEE 802.11, Bluetooth (IEEE 802.15.1 WPAN (wireless personal area network)), and the like. Similarly, the network devices 620 can connect to WAN technologies including, but not limited to, point to point links, circuit switching networks like integrated services digital networks (ISDN), packet switching networks, and digital subscriber lines (DSL).

Figure 7:
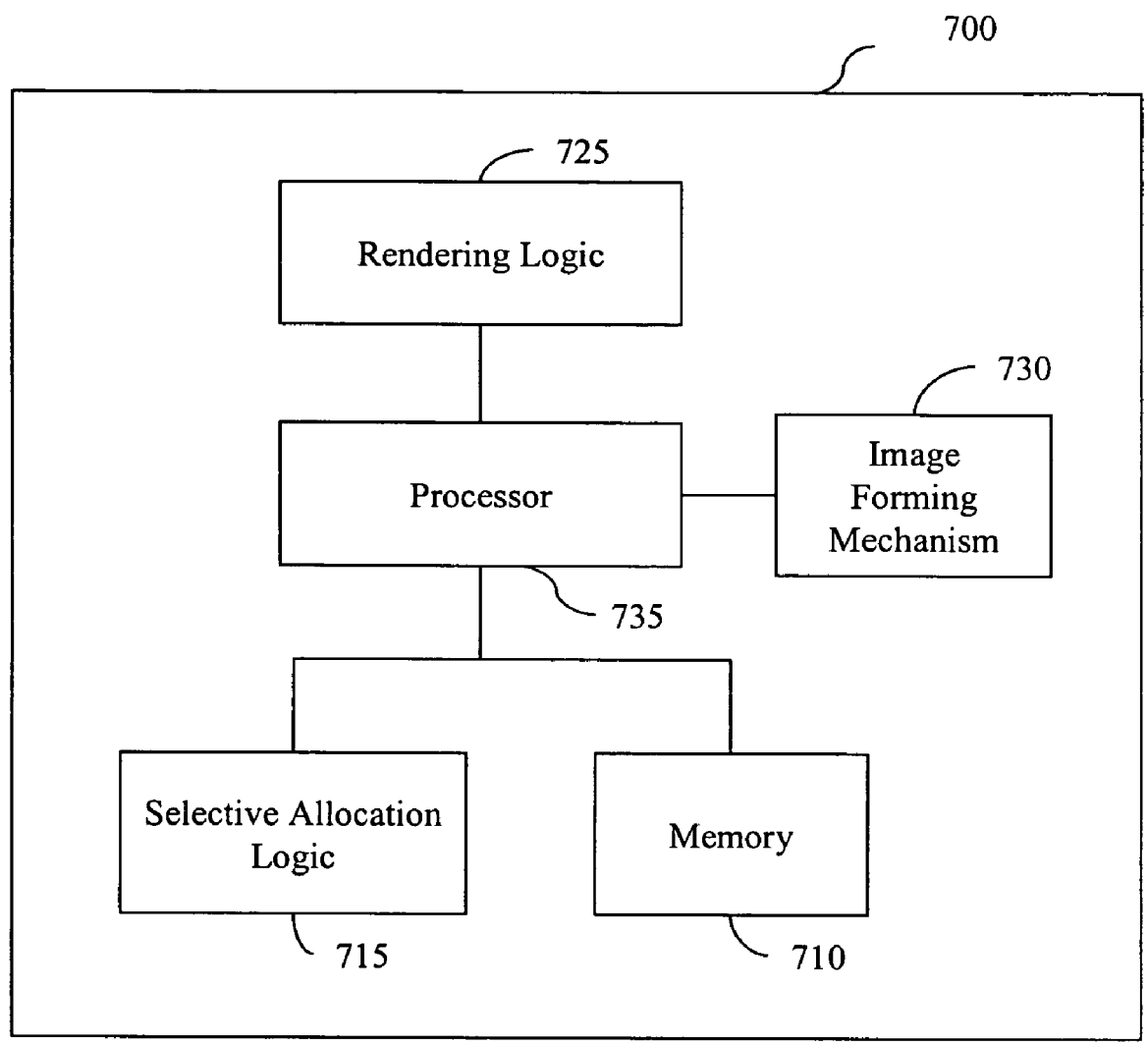
FIG. 7 illustrates an example image forming device in which example selective memory allocation systems and methods may operate.

FIG. 7 illustrates an example image forming device 700 on which the example systems and methods described herein may operate. The image forming device 700 may include a memory 710 configured to store print data, to be used for image processing, and so on. The image forming device 700 may include a selective allocation logic 715 configured to selectively allocate subsets of the memory 710. By way of illustration, the selective allocation logic 715 may allocate memory locations to various applications and/or to various print jobs based, at least in part, on the memory quality. For example, subsets of memory 710 may be allocated in order from highest quality to lowest quality.

The image forming device 700 may receive print data to be rendered. Thus, the image forming device 700 may include a rendering logic 725 configured to generate a printer-ready image from print data. Rendering varies based on the format of the data involved and the type of imaging device. In general, the rendering logic 725 converts high-level data into a graphical image for display or printing (e.g., the print-ready image). For example, one form is ray-tracing that takes a mathematical model of a three-dimensional object or scene and converts it into a bitmap image. Another example is the process of converting HTML into an image for display/printing. It is to be appreciated that the image forming device 700 may receive printer-ready data that does not need to be rendered and thus the rendering logic 725 may not appear in some image forming devices.

The image forming device 700 may also include an image forming mechanism 730 configured to generate an image onto print media from the print-ready image. The image forming mechanism 730 may vary based on the type of the imaging device 700 and may include a laser imaging mechanism, other toner-based imaging mechanisms, an ink jet mechanism, a digital imaging mechanism, or other imaging reproduction engine. A processor 735 may be included that is implemented with logic to control the operation of the image-forming device 700. In one example, the processor 735 may include a logic that is configured to execute Java instructions. Other components of the image forming device 700 are not described herein but may include media handling and storage mechanisms, sensors, controllers, and other components involved in the imaging process.

Figure 8:
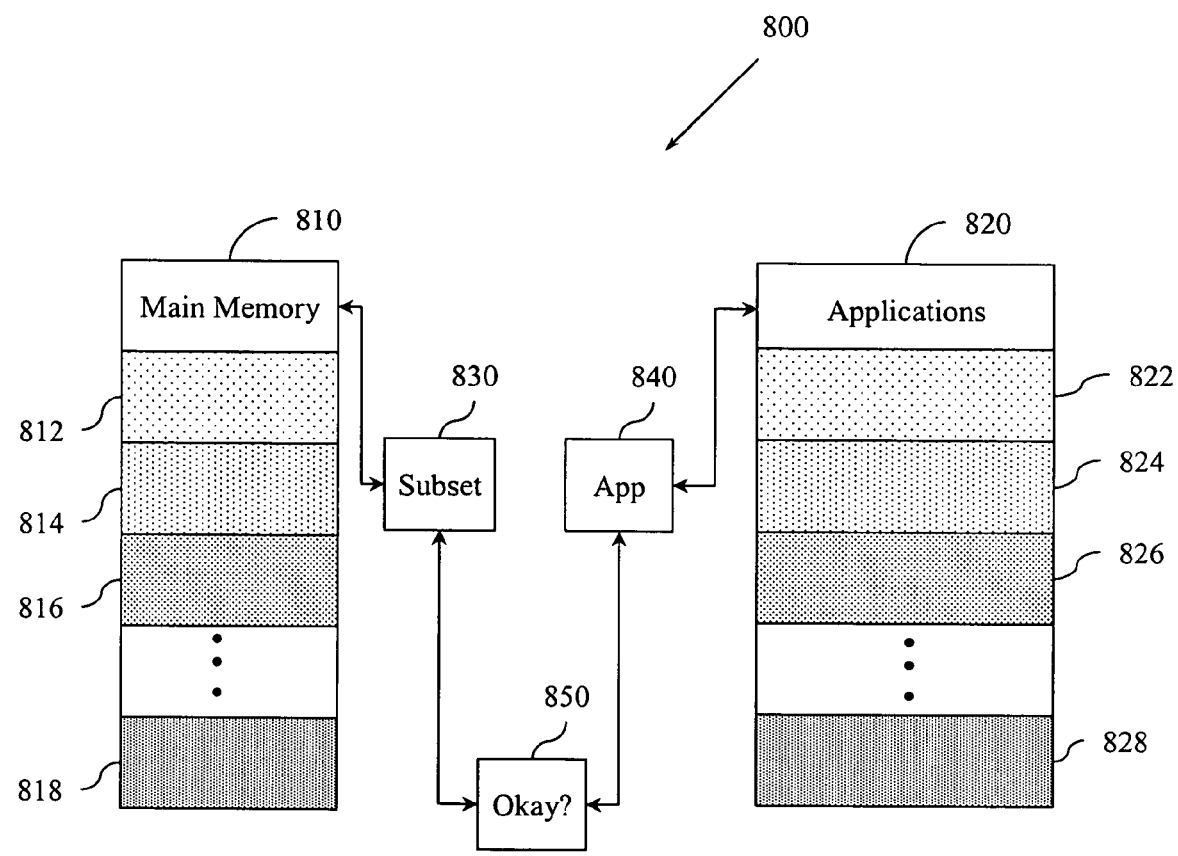
FIG. 8 illustrates a simulated screen shot from a selective memory allocation application.
Figure 9:
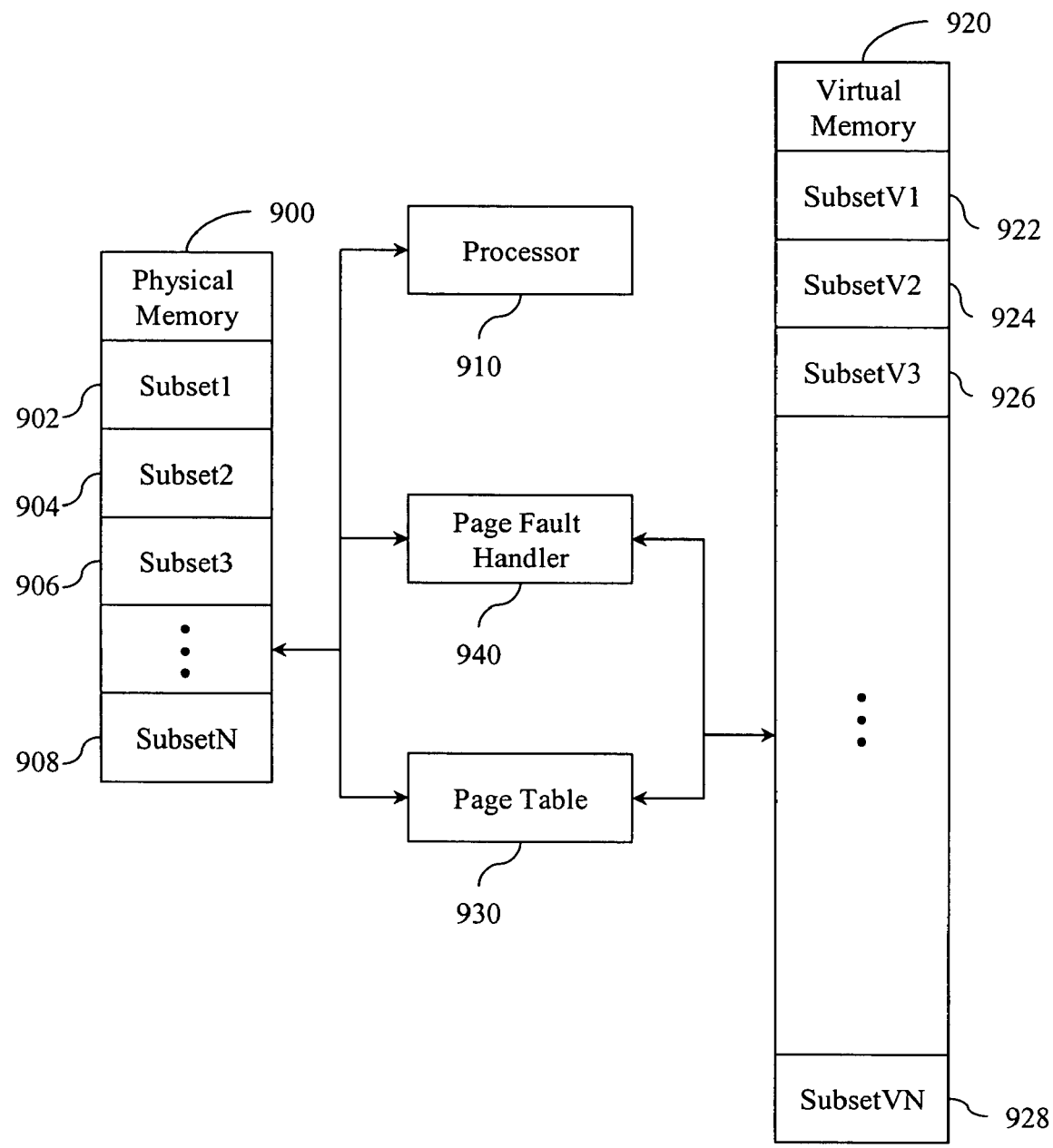
FIG. 9 illustrates components of an example virtual memory system.

FIG. 8 illustrates a simulated screen shot 800 from a selective memory allocation application. The simulated screen shot 800 includes a graphical representation of a memory map 810. The graphical representation may illustrate the quality and/or relative quality of memory by colors, text, numerics, position, and the like. For example, memory area 812 has a first less dense fill that may indicate that the memory area 812 has a first (e.g., high) quality while memory area 818 has a more dense fill that may indicate that the memory area 818 has a second (e.g., low) quality. The simulated screen shot 800 also includes a graphical representation of a set of applications 820. The graphical representation may illustrate a memory quality acceptable to an application, a discrete application criticality, and/or a relative application criticality by colors, text, numerics, position, and the like. For example, application 822 has a first less dense appearance that may indicate a preference for memory with a first (e.g., high) quality while application 828 has a second more dense appearance that may indicate a willingness to accept a second (e.g., lower) quality of memory.

The simulated screen shot 800 also illustrates a memory block 830 being considered for allocation to an application 840. In one example, the memory block 830 may be the highest quality block of memory available and the application 840 may be an application with the preference for the highest quality block of memory available. In another example, the block 830 may be the block of memory whose quality most closely matches the memory quality desired by the application 840. In still another example, the suggested block 830 may be the block of memory whose allocation will maximize a memory usage utility value.

In one example, a graphical user interface associated with the simulated screen shot 800 may present an accept/deny button (e.g., okay button 850) to a user to facilitate indicating whether a system should proceed with the allocation. In another example, a system may simply display the suggested allocation and proceed. In yet another example, the system may display the suggested allocation and if a memory utility measure will fall below a threshold value then a warning message may be displayed to the user. Based on the warning message the user may decide, for example, to abort the allocation.

While a memory map 810 and set of applications 820 are illustrated, it is to be appreciated that other graphical user interfaces may be employed with the example systems and methods described herein. For example, a user interface may present a graphical representation of available memory coded to indicate quality (e.g., color-coded). The user interface may then also allow a user to, for example, drag and drop an application into a coded area of memory to indicate a desired memory allocation. Similarly, a user interface may track memory allocations and provide an animation concerning allocations and so on.

So far, the example systems, methods, and figures have treated memory as separate units (e.g., pages). But those skilled in the art appreciate that in some systems physical memory may be divided into related sections as part of an interleaving system. A processor may therefore access different memory sections at different times. A processor may do so to mitigate problems associated with memory chip delays caused by memory chip wait states. For example, a DRAM may have a relatively slow access speed when compared to the speed at which a CPU may make memory requests. Thus, interleaving memory can facilitate a processor more immediately accessing different memory locations if they are located in different memory sections.

Systems that employ memory interleaving may benefit from a memory quality based allocation system that facilitates having different memory regions participating in an interleaving collaboration share similar memory quality characteristics. In one example, different participating memory regions may be required to have the same memory quality ranking while in another example different participating memory regions may be required to meet or exceed a threshold for participation in the interleaving.

Additionally, which regions are used to implement an interleaving collaboration may change dynamically based on changing memory quality conditions. For example, if four different memory modules are involved in an interleaving collaboration, and the quality of one of the memory modules changes to the point where it is no longer in harmony with the other modules, then the module may be removed from the collaboration and a substitute module may replace it.

While the systems, methods, and so on have been illustrated by describing examples, and while the examples have been described in considerable detail, it is not the intention of the applicants to restrict or limit the scope of the appended claims to such detail. It is, of course, not possible to describe every conceivable combination of components or methodologies for purposes of describing the systems, methods, and so on employed in selectively allocating memory based on memory quality. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system, comprising:
   a data receiving logic to receive a quality data that identifies a memory quality of one or more allocatable subsets of a memory, where the quality data stores information concerning one or more of, a discrete quality ranking for one or more of the allocatable subsets of memory, a relative quality ranking for one or more of the allocatable subsets of memory, and a record of memory errors experienced by one or more of the allocatable subsets of memory, where the discrete quality ranking and the relative quality ranking rate memory health as measured by a record of memory errors; and
   an allocation logic to selectively allocate a subset of memory from the memory to an application based, at least in part, on the memory quality, where the allocation logic is to selectively allocate memory that is least likely to fail to a critical application and where the allocation logic is to selectively allocate memory that is more likely to fail to a less critical application.

2. The system of claim 1, where the data receiving logic is to receive a preference data that identifies one or more memory quality preferences of the application and where the allocation logic is to selectively allocate the subset of memory from the memory based, at least In part, on the memory quality in light of the one or mare memory quality preferences.

3. The system of claim 1, including:
   a user Interface logic to present a user with a suggested memory allocation and to receive an indication from the user concerning whether the suggested memory allocation is acceptable.

4. The system of claim 3, including:
   a learning logic to analyze whether a suggested memory allocation is acceptable to the user based on the indication from the user and to dynamically reconfigure the user interface logic based on the analysis.

5. The system of claim 1, where the allocation logic is to selectively allocate memory that is least likely to experience a memory error as determined by examining the memory health.

6. The system of claim 1, where the allocation logic is to selectively allocate memory whose discrete quality ranking exceeds a quality ranking in the preference data.

7. The system of claim 1, the allocation logic being configured to interact with a virtual memory system logic.

8. The system of claim 7, where the allocation logic performs a logical allocation of the subset of memory and the virtual memory system logic performs a physical allocation of the subset of memory.

9. The system of claim 1, the allocation logic being configured to allocate one or more subsets of memory with a related memory quality to an interleaving logic.

10. A system. comprising:
    a data receiving logic to receive a quality data that identifies a memory quality of one or more allocatable subsets of a memory, where the quality data stores information concerning one or more of, a discrete quality ranking for one or more of the allocatable subsets of memory, a relative quality ranking for one or more of the allocatable subsets of memory, and a record of memory errors experienced by one or more of the allocatable subsets of memory, where the discrete quality ranking and the relative quality ranking rate memory health as measured by a record of memory errors; and
    an allocation logic to selectively allocate a subset of memory from the memory to an application based, at least in part, on the memory quality, where the allocation logic is to selectively allocate memory that is least likely to fall to a critical application and where the allocation logic is to selectively allocate memory that is more likely to fall to a less critical application.
    where the data receiving logic is to receive a preference data that identifies one or more memory quality preferences of the application and where the allocation logic is to selectively allocate the subset of memory from the memory based, at least in part, on the memory quality in light of the one or more memory quality preferences: and
    where the preference data stores information concerning one or more of, a memory quality level acceptable to the application, a memory quality level preferred by the application, a discrete application criticality rank, and a relative application criticality rank.

11. The system of claim 10, where the allocation logic allocates the highest quality memory available in the memory to an application having the highest criticality rank.

12. The system of claim 10, where the allocation logic allocates memory that satisfies a quality threshold with respect to one or more of, the memory quality level acceptable to the application, the discrete application criticality rank, the memory quality level preferred by the application, and the relative application criticality rank.

13. The system of claim 12, where the quality threshold is one or more of, memory quality exceeding the quality acceptable to the application, memory quality meeting the quality acceptable to the application, memory quality being within a percentage of the quality acceptable to the application, and memory quality being within one rank of the quality acceptable to the application.

14. The system of claim 12, where the allocation logic allocates memory so that a memory utility measure is optimized.

15. The system of claim 12, where the utility measure is the product of a memory quality ranking of an allocated subset of memory and an application preferred memory ranking for an application to which the allocated subset of memory is allocated.

16. A method, comprising:
receiving a health data that identifies a memory health of one or more subsets of a set of allocatable memory, where the health data stores information concerning memory errors experienced by one or more allocatable subsets of the memory and where the health data stores information concerning the likelihood that an allocatable subset of memory will experience a memory error; and
selectively allocating a subset of memory from the set of allocatable memory to an application based, at least in part, on the memory health,
where a subset of memory that is least likely to fail is allocated to a critical application and where a subset of memory that is more likely to fail is allocated to a less critical application.

17. The method of claim 16, comprising:
receiving a preference data that identifies one or more memory health gfpreferences of the application, where the preference data stores information concerning a memory health level required by the application; and
selectively allocating the subset of memory based, at least in part, on the memory health as compared to the memory health preference.

18. The method of claim 17, where the information concerning memory errors includes data concerning one or more of, transient single bit errors, multi-bit errors, and stuck-at single bit errors experienced by a subset.

19. The method of claim 17, where the subset of memory that is allocated satisfies a health threshold with respect to the memory health level required by the application.

20. The method of claim 19, further including defining the health-threshold as one or more of, memory health exceeding the health acceptable to the application, memory health meeting the health acceptable to the application, memory health being within a percentage of the health acceptable to the application, and memory health being within one rank of the health acceptable to the application.

21. The method of claim 17, where the subset of memory is selectively allocated based, at least in part, on an affect the allocation will have on a memory utility measure.

22. The method of claim 17, including:
presenting a suggested memory allocation to a user; and
accepting a decision concerning the suggested memory allocation from the user.

23. The method of claim 22, including:
analyzing the decision concerning the suggested memory allocation and adapting one or more memory allocation parameters based, at least in part, on the analyzing.

24. The method of claim 17, including sending a signal to a virtual memory system logic concerning allocating the subset of memory.

25. The method of claim 24, including the virtual memory system logic performing a physical allocation of the subset of memory.

26. The system of claim 17, including allocating one or more subsets of memory with a related memory quality to an interleaving logic.

27. A system, comprising:
a memory for which a quality data that identifies memory quality is available; and
an allocation logic configured to:
receive and analyze the quality data;
receive and analyze a preference data that identifies a memory quality preference of the application;
dynamically select a memory allocation algorithm based on one or more of, the quality data, the preference data, and a memory utility measure; and
use the memory allocation algorithm to selectively allocate a subset of memory from the memory based, at least in part, on the quality data, and the preference data.
where the allocation logic is to selectively allocate memory that is less likely to fail to a more critical application and where the allocation logic is to selectively allocate memory that is more likely to fail to a less critical application.

28. A system, comprising:
a data receiving logic configured to receive a quality data that identifies a memory quality of one or more allocatable subsets of a memory, the memory quality being determined from the number of memory errors recorded for a memory and from the likelihood a memory will experience a memory error
an allocation logic configured to select a subset of memory to allocate from the memory to an application based, at least in part, on the memory quality as identified in the quality data; and
a virtual memory system logic configured to physically allocate the subset of memory selected by the allocation logic in response to receiving a signal from the allocation logic.
where the allocation logic is to selectively allocate memory that is less likely to fail to a more critical application and where the allocation logic is to selectively allocate memory that is more likely to fail to a less critical application.

29. The system of claim 28, where the allocation logic is configured to control the virtual memory system logic to deallocate the allocated subset of memory based, at least in part, on receiving a quality data that indicates the memory quality of the subset of memory has changed.

* * * * *

UNITED STATES PATENT AND TRADEMARK OFFICE
CERTIFICATE OF CORRECTION

PATENT NO. : 7,484,065 B2
APPLICATION NO. : 10/827946
DATED : January 27, 2009
INVENTOR(S) : Ken Gary Pomaranski et al.

It is certified that error appears in the above-identified patent and that said Letters Patent is hereby corrected as shown below:

In column 13, line 21, delete "Ethemet/IEEE" and insert -- Ethernet/IEEE --, therefor.

In column 16, line 2, in Claim 1, delete "application." and insert -- application, where the application is to run in the subset of memory. --, therefor.

In column 16, line 7, in Claim 2, delete "In" and insert -- in --, therefor.

In column 16, line 8, in Claim 2, delete "mare" and insert -- more --, therefor.

In column 16, line 11, in Claim 3, delete "Interface" and insert -- interface --, therefor.

In column 16, line 37, in Claim 10, delete "system." and insert -- system, --, therefor.

In column 16, line 53, in Claim 10, delete "fall" and insert -- fail --, therefor.

In column 16, line 55, in Claim 10, delete "application." and insert -- application, --, therefor.

In column 16, line 61, in Claim 10, delete "preferences:" and insert -- preferences; --, therefor.

In column 17, line 37, in Claim 16, delete "fall" and insert -- fail --, therefor.

In column 17, line 39, in Claim 16, delete "fall" and insert -- fail --, therefor.

In column 17, line 43, in Claim 17, delete "gfpreferences" and insert -- preferences --, therefor.

In column 17, line 57, in Claim 20, delete "health-threshold" and insert -- health threshold --, therefor.

In column 18, line 32, in Claim 27, delete "data." and insert -- data, --, therefor.

In column 18, line 44, in Claim 28, delete "error" and insert -- error; --, therefor.

UNITED STATES PATENT AND TRADEMARK OFFICE
CERTIFICATE OF CORRECTION

PATENT NO.        : 7,484,065 B2
APPLICATION NO.   : 10/827946
DATED             : January 27, 2009
INVENTOR(S)       : Ken Gary Pomaranski et al.

It is certified that error appears in the above-identified patent and that said Letters Patent is hereby corrected as shown below:

In column 18, line 53, in Claim 28, delete "logic." and insert -- logic, --, therefor.

Signed and Sealed this

Nineteenth Day of May, 2009

JOHN DOLL
*Acting Director of the United States Patent and Trademark Office*